(12) United States Patent
Noyelle

(10) Patent No.: US 10,593,135 B2
(45) Date of Patent: Mar. 17, 2020

(54) METHODS AND SYSTEMS FOR COLLECTING AND EVALUATING VEHICLE STATUS

(71) Applicant: Olivier Noyelle, West Hollywood, CA (US)

(72) Inventor: Olivier Noyelle, West Hollywood, CA (US)

(*) Notice: Subject to any disclaimer, the term of this patent is extended or adjusted under 35 U.S.C. 154(b) by 0 days.

(21) Appl. No.: 15/484,454

(22) Filed: Apr. 11, 2017

(65) Prior Publication Data
US 2017/0294059 A1    Oct. 12, 2017

Related U.S. Application Data

(60) Provisional application No. 62/321,093, filed on Apr. 11, 2016.

(51) Int. Cl.
| G07C 5/08 | (2006.01) |
| G07C 5/00 | (2006.01) |
| H04L 29/08 | (2006.01) |
| H04W 76/10 | (2018.01) |
| G06N 20/00 | (2019.01) |

(52) U.S. Cl.
CPC .......... *G07C 5/0808* (2013.01); *G07C 5/008* (2013.01); *G07C 5/0825* (2013.01); *H04L 67/12* (2013.01); *H04L 67/26* (2013.01); *H04W 76/10* (2018.02); *G06N 20/00* (2019.01)

(58) Field of Classification Search
CPC .... G07C 5/0808; G07C 5/008; G07C 5/0825; H04W 76/10; H04L 67/12; H04L 67/26; G06N 99/005; H05K 999/99

USPC ........................................................ 701/31.5
See application file for complete search history.

(56) References Cited

U.S. PATENT DOCUMENTS

| 8,635,091 | B2 | 1/2014 | Amigo et al. | |
| 8,929,517 | B1* | 1/2015 | Lavian | H04M 3/493 |
| | | | | 379/88.11 |
| 8,930,067 | B1* | 1/2015 | Green | G06Q 20/127 |
| | | | | 701/33.2 |
| 9,031,710 | B2 | 5/2015 | Barrett | |
| 9,135,758 | B2 | 9/2015 | Giraud | |
| 9,342,935 | B2 | 5/2016 | Lundsgaard et al. | |
| 9,367,968 | B2 | 6/2016 | Giraud et al. | |
| 9,525,959 | B1* | 12/2016 | Eddings | H04W 8/183 |
| 10,065,074 | B1* | 9/2018 | Hoang | G16H 40/63 |
| 2007/0099636 | A1* | 5/2007 | Roth | G06Q 30/0247 |
| | | | | 455/466 |
| 2007/0156311 | A1* | 7/2007 | Elcock | G07C 5/008 |
| | | | | 701/31.4 |
| 2011/0112717 | A1* | 5/2011 | Resner | G07C 5/008 |
| | | | | 701/31.4 |

(Continued)

*Primary Examiner* — Tuan C To
(74) *Attorney, Agent, or Firm* — Dariush G. Adli; Adli Law Group P.C.

(57) ABSTRACT

The present disclosure discloses a method and system for collecting and evaluating powered vehicle's status utilizing vehicle's on-board diagnostic, controllers, time and location. The present disclosure creates one or more databases where identifiable behavior or evaluative characteristics can be analyzed or categorized to inform, alert and assist the driver with voice assistance to avoid or fix specific issues. The evaluation can include prediction for future events. The database can be correlated or evaluated with other databases for a wide variety of uses.

2 Claims, 19 Drawing Sheets

(56) References Cited

U.S. PATENT DOCUMENTS

| | | | |
|---|---|---|---|
| 2012/0136765 A1* | 5/2012 | Corn | G06Q 10/06 705/34 |
| 2012/0197743 A1* | 8/2012 | Grigg | G06Q 20/20 705/16 |
| 2012/0239223 A1* | 9/2012 | Schwarz | G06Q 30/06 701/2 |
| 2014/0052789 A1* | 2/2014 | Marcucci | G06Q 10/10 709/204 |
| 2014/0164352 A1* | 6/2014 | Denninghoff | H03H 9/1092 707/711 |
| 2014/0343831 A1* | 11/2014 | Hosey | B60R 16/03 701/113 |
| 2015/0073805 A1* | 3/2015 | Stern | G10L 13/07 704/260 |
| 2015/0268059 A1* | 9/2015 | Borghesani | H04W 4/029 701/32.3 |
| 2016/0006577 A1 | 1/2016 | Logan | |
| 2016/0365086 A1* | 12/2016 | Osawa | G10L 13/08 |
| 2017/0004661 A1 | 1/2017 | Winiecki | |
| 2017/0323356 A1* | 11/2017 | Gharabegian | G06Q 30/0601 |

* cited by examiner

1200 — OBD Monitors Status
1203 — Not Ready

1201 —
| | |
|---|---|
| EGR | Not ready |
| Component | Ready |
| Fuel system | Ready |
| Misfire | Ready |
| Secondary Air System | Ready |
| Catalyst | Ready |
| Heated Catalyst | Ready |
| Evaporative System | Ready |
| Secondary Air System | Ready |
| Oxygen (O2) Sensor | Ready |
| Oxygen Sensor Heater | Not ready |
| A/C Refrigerant | .. |

Monitors readiness assistant

| | |
|---|---|
| Speed | 25 Mph |
| RPM | 850 RPM |
| Temperature | 70°F |
| Throttle | 25% |

VEHICLE HEALTH REPORT

VIN: xxxxxxxxx
Vehicle: Brand Model Year
First use: xx/xx/xxxx
Last use: xx/xx/xxxx

ERRORS DETECTION HISTORY

| First time | Last time | Error description | nb of occurrences | Criticity |
|---|---|---|---|---|
| | | | | |

FIG. 19

METHODS AND SYSTEMS FOR COLLECTING AND EVALUATING VEHICLE STATUS

CROSS-REFERENCE TO RELATED PATENT APPLICATIONS

Embodiments of the present invention relate to U.S. Provisional Application Ser. No. 62/321,093, filed Apr. 11, 2016, entitled "METHODS AND APPARATUS FOR COLLECTING AND EVALUATING VEHICLE STATUS", the contents of which are incorporated by reference herein in its entirety and which is a basis for a claim of priority.

FIELD OF THE DISCLOSURE

The present disclosure generally relates to a diagnostic system for vehicles. More specifically, the present disclosure provides a diagnostic system that collects and evaluates the status of a vehicle, alerts the driver when important events or potential problems are detected, and proposes solutions to the driver.

BACKGROUND OF THE INVENTION

Several mechanisms are available on the market that provide means of monitoring vehicles. Unfortunately, most of them are designed to run one-time passive diagnosis and requires multiple steps to lookup error codes and associate them to a specific vehicle.

Other examples are On-Board Diagnostics (OBD) data recorders that are usually used by auto insurance company to track drivers' activities. However, such system focuses on drivers' behavior instead of their vehicles. This limits the system's usefulness for creating a complete dataset suitable for developing, a useful and objective vehicle diagnostic and notification service. Another shortcoming with this system is that the data collected is not related to the vehicle's status or health. The system is also very intrusive to drivers' privacy and the target market is for consumers who want to save money on their insurance policy.

Some other systems provide real-time data collection or diagnosis, but their main purpose focuses on drivers' behaviors as well as most of them require the application and smartphone's GPS to run all the time, which impacts the smartphone's battery life. Also, alerts for these systems are displayed on an application screen which are not immediately visible when drivers are using other applications like GPS guidance system or when the drivers' phones are in their pockets while driving.

U.S. Pat. No. 9,367,368 to Giraud et al. discloses a System and Method for Mobile Application using Vehicle Telematic Data which "transmits an indication of vehicle state for delivery to a mobile computing device over at least a wireless datalink component of a communication network." However, Giraud's invention differs from the present disclosure in that the modular device used by the present disclosure has much simpler architecture than the Telecommunication Control Units (TCU) described in this patent. The present disclosure uses the mobile phone as a central network platform (transfer data to/receive data from vehicle and the cloud). Further, Giraud's TCU uses Machine to Machine (M2M) cellular data exchange with a SIM card and no data is passing through the smartphone to interact with the Service Platform. The modular device used in the present disclosure also does not embed any sensor (Like GPS) and utilizes sensors from the smartphone instead, which greatly reduce the manufacturing cost for the disclosed modular device. The present disclosure includes a Low power cut-off system instead of relying on a battery to avoid vehicle's battery drain. The present disclosure also includes a more advanced and detailed notification service, and is based on regular scans triggered by a service platform at regular intervals and orchestrated by the smartphone. The present disclosure optionally provides easy password-less accounts and registration.

U.S. Pat. No 2017/0004661 to Winiecki discloses an Automotive Predictive Failure System which "is able to performs real-time calculations to detect any automotive performance variations and also to calculate a part-performance efficiency for each of the vehicular components that is communicably coupled with one of vehicular sensor." However, Winiecki invention differs from the present disclosure in that the process used in the present disclosure compares timestamped performance data for a given vehicle, with similar data but from multiple vehicle having common parts (Model, Manufacturer, supplies) and additional data sources providing predictable knowledge of existing vehicle failures matching specific metrics or conditions.

U.S. Pat. No. 9,342,935 to Lundsgaard et al. discloses a Smartphone Based System For Vehicle Monitoring Security which "aggregate[s] and compare[s] a vehicle's performance relative, for example, to other similar vehicles, to other vehicles in a particular or similar geographic location, to vehicles in similar weather conditions, or the like, while maintaining individual privacy and security." However, Lundsgaard's invention differs from the present disclosure in that the system described in the present disclosure offers more flexibility and combination of use, allowing drivers to connect with multiple devices and monitor multiple vehicles. The present disclosure also includes some logic to recognize vehicles that does not return values to VIN queries.

The existing technology developments have the inherent shortcomings of not offering automatic vehicle detection and limiting the product scope to dedicated drivers and their main vehicles. These developments do not offer any low power detection mechanism to avoid battery drain if the vehicle is not in use for a long time and/or have a weak battery. Further, none of the current developments offers a voice notification system to let the drivers focus on the road. The conventional technology also does not generate any Vehicle Health Report, which may be required to pre-qualify for the mandatory smog check or vehicle inspections is some states and countries.

Accordingly, there exists a need for improved methods and systems for collecting and evaluating vehicle status.

SUMMARY OF THE INVENTION

In accordance with one embodiment of the present disclosure, a diagnostic system for vehicles is disclosed. The system comprises: (1) a modular device with a wireless communication port for establishing a communication with a mobile device, and a connector for coupling the modular device to a vehicle's Diagnostic Link Connector to transmit and receive data from the vehicle's controllers; (2) a mobile application that is installed and executed on the mobile device's operating system; and (3) a Cloud Service that comprises one or more database, Application Program Interfaces (APIs), Business Logic, and an intelligent learning engine, where the Cloud Service is connected to third party services including push notifications, short messages and automated call services. The modular device receives requests from the mobile application to collect the vehicle's data and transmits the data collected from the vehicle to the mobile application. The Cloud Service triggers the mobile application at a specified interval to initiate data collection from the vehicle. The mobile application sends the data collected from the modular device to the Cloud Service and the Could Service analyzes the data, stores the data and generates a message if the data matches a rule defined in the Cloud Service or by vehicle's driver. Then the Cloud Service sends the messages to the mobile application through a push notification service and the mobile application alerts the vehicle's driver.

The diagnostic system is designed to be operated by a single user or group of users with a single or multiple vehicles transparently (i.e. family, vehicle fleet etc.). The focus of the system is not the driver but the vehicle(s) which the user can use on a daily basis or on purpose.

The modular device is modular by design and can use different technology to interact with the vehicle, the mobile device and the mobile application in a secure manner. It includes a low-power cutoff mechanism to prevent battery drain and shutdown the modular device when the engine is not running in order to prevent any intrusion tentative when the vehicle is on standby for a long time. The modular device interfaces with existing standard protocols of the automotive industry. Some of the mobile application's logic can be embedded in the modular device and use a cellular connection in place of the regular wireless connectivity. In that case, no application is required on the mobile device. The notifications are SMS based and can be read over Bluetooth in the vehicle. Then the driver can interact with the system out of the road by SMS or Automated Phone System interaction. The wireless communication port(s) of the modular device also comprises a secure mechanism to pair with the smartphone.

The operating system of the mobile device comprises push notification and a voice synthesis services; the push notifications are silent to trigger the data collection in the background or visible to alert the driver of any event; the visible notifications are relying on the integrated voice synthesis service to alert the driver using the default mobile device language.

The mobile application requests the modular device to collect the Vehicle Identification Number (VIN), the available OBD Parameter IDentifiers (PIDs) and ECUs to create or update a local vehicles profile; the local vehicle profile is enriched and updated each time it interacts Cloud Service.

The mobile application is intended to run as a background task and wake up every time it's triggered by a silent push notification. However, it includes an interface with an easy step by step installation process, a real-time Dashboard, the profiles and status for each vehicle it is linked to, a Diagnostic Link Connector locator, a Gas Station and Mechanics locator, an OBD Monitors Readiness assistance service, and settings to customize the application behavior.

The mobile application is available in multiple languages.

The system comprises a password-less account service to activate the application, store and access the vehicles history.

The system comprises a marketplace to connect drivers with third Party services.

These and other features, aspects and advantages of the present invention will become better understood with reference to the following drawings, description and claims.

BRIEF DESCRIPTION OF THE DRAWINGS

FIG. 12 is a schematic diagram showing an exemplary display screen of an OBD-II monitors readiness according to an embodiment of the present disclosure.

FIG. 19 is a schematic diagram showing an exemplary Vehicle Health Report generated by the disclosed system according to an embodiment of the present disclosure.

DETAILED DESCRIPTION OF THE PREFERRED EMBODIMENT(S) AND INVENTION

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

As stated above, conventional diagnostics systems for vehicles are stand-alone appliances that are used infrequently, and they must be correlated with manuals associating the diagnostic codes with actual issues. The present disclosure, described in enabling detail below, provides a system and method for connecting to and retrieving information from a vehicle in real-time or on a frequent basis depending on the mode chosen by the driver, and providing immediate advice to the driver on how to deal with any detected event.

Figure 1:
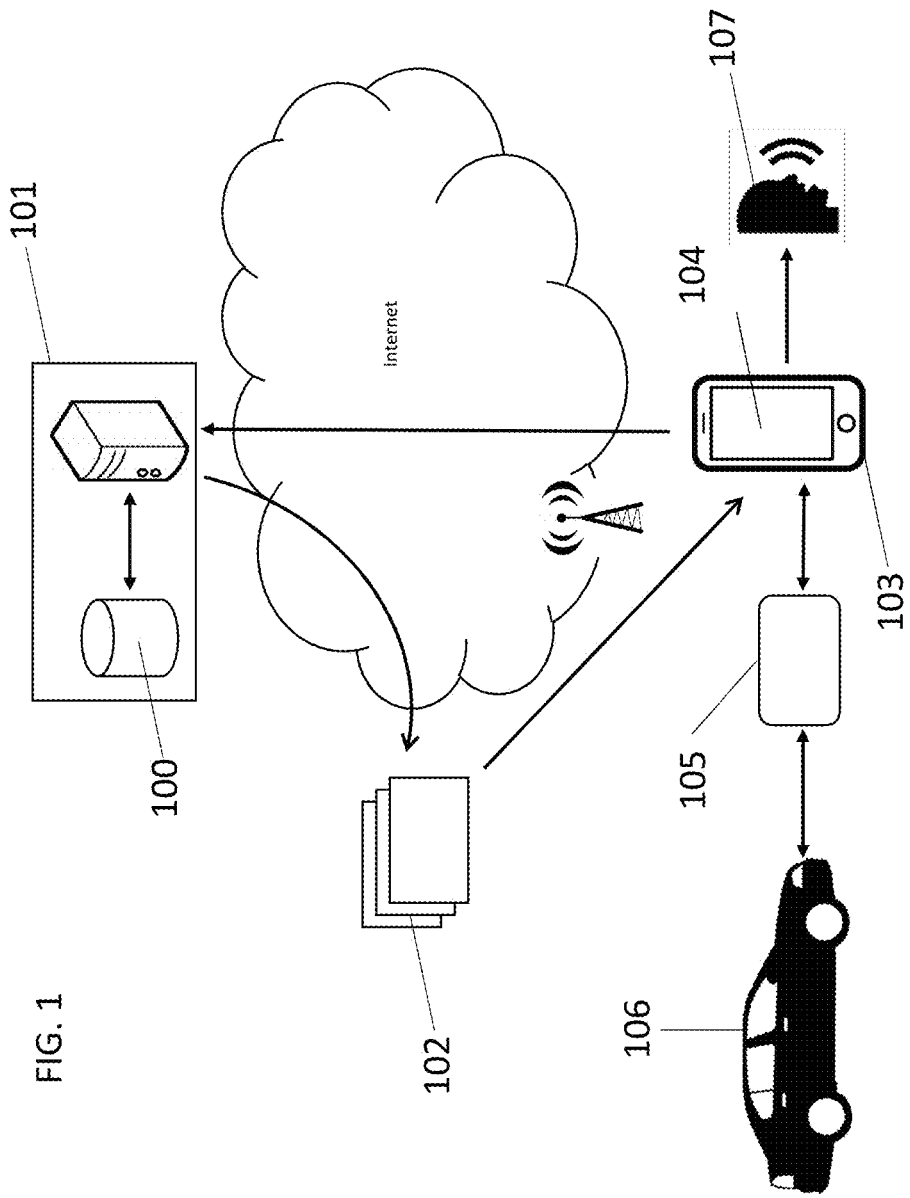
FIG. 1 is a schematic diagram showing the disclosed system and the process for informing and notifying drivers according to an exemplary embodiment of the present disclosure.

FIG. 1 is a schematic diagram showing a diagnostic system for vehicles and the process for the diagnostic system to collect and evaluate vehicles' status, and to inform drivers of the status according to an exemplary embodiment of the present disclosure. Here, the disclosed diagnostic system comprises a Cloud Service (101), a Push Notification Service (PNS)(102), a Mobile Application (104) that is executed and run on a mobile device's (103) Operating System, and a Modular Device (105).

First, Cloud Service (101) sends silent notification requests at a regular interval (e.g., 1-10 minutes) to the PNS (102) for each mobile device (i.e., smartphone, tablet computers etc.) registered in the database (100). The Operating System (OS) for each mobile device may be linked to a different Push Notification Service depending on the system's configuration. Then PNS (102) sends the silent notification requests to the registered mobile devices' (103) OS to trigger the Mobile Application (104) that is running in the background of the mobile device (103). In the background, the Mobile Application (104) requests the Modular Device (105) to collect data from the vehicle (106). In the background, the Mobile Application (104) also aggregates the collected data and send them to the Cloud Service (101) for analysis and archiving based on user rules defined and existed in the database (100). If the analysis matches a notification rule, a message is generated based on the driver's language settings and a visible notification including the message is sent to the PNS (102). Finally, the PNS (102) sends the visible notification to the mobile device (103) and the mobile device (103) displays the notification and trigger the Mobile Application (104) in the background to speak a voice-based version of the message (107).

Figure 2:
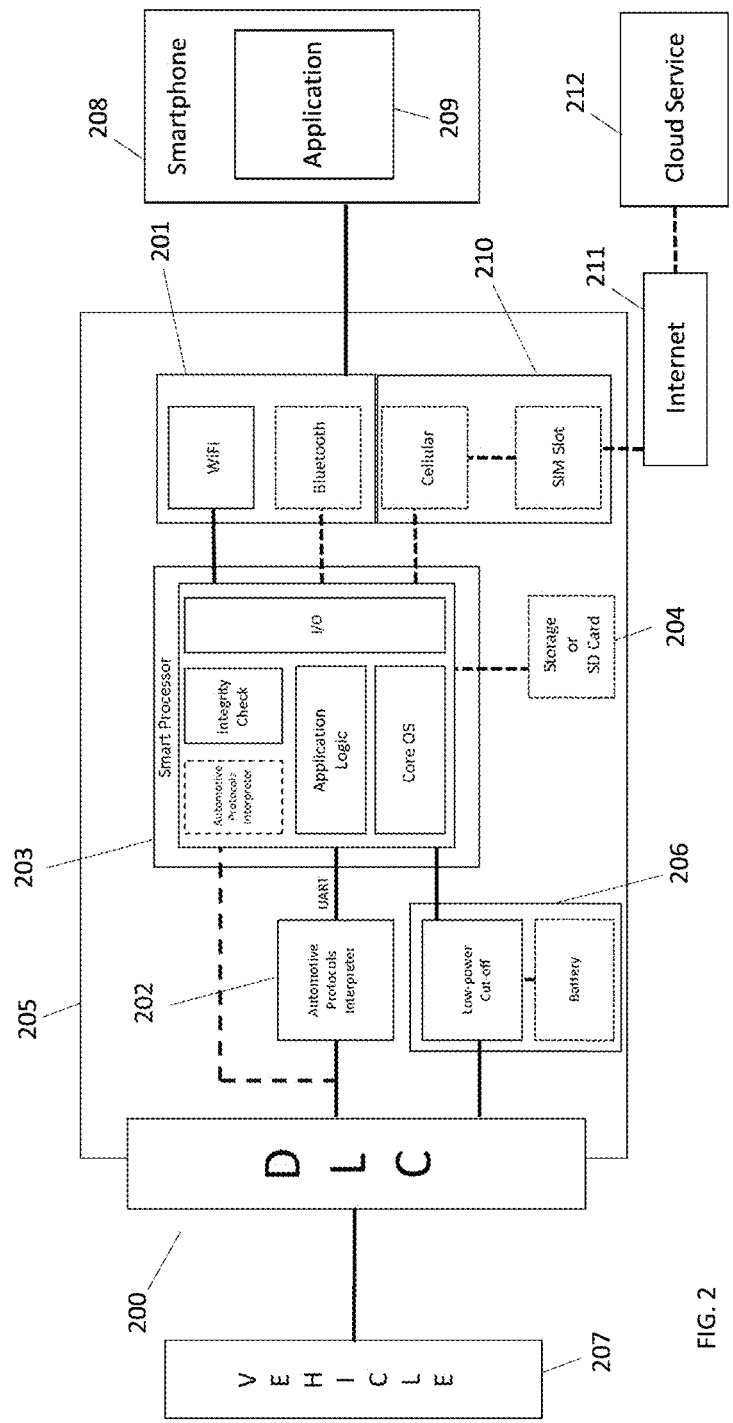
FIG. 2 is a block diagram showing a Modular Device for gathering and compiling vehicle usage data according to an exemplary embodiment of the present disclosure.

FIG. 2 is a block diagram showing the Modular Device used by the present disclosure for gathering and compiling vehicle usage data according to an exemplary embodiment. Here, Modular Device (205) comprises a J1962 male diagnostic 16 PINs connector (200) to interface with any vehicle (207) manufactured since 1996-2004 depending on the country. Note that the connector (200) can be switched to a different model or type of connector to make the Modular Device (205) compatible with vehicles that are incompatible with J1962. The use of J1962 merely serves as an example and should not be construed as a limitation of the present disclosure.

The data PINs of the connector (200) are interfaced with an Automotive Protocols Interpreter Integrated Circuit (202) and the power PINs of the connector (200) are interfaced with a Power Management Module (206). The Power Management Module (206) includes low power cut-off system to measure the input voltage from the vehicle and cut the power at a specific threshold to protect the vehicle battery. As an option, the Power Management Module may include a small battery to maintain the Modular Device's (205) operation when the input voltage is too low. The small battery can be recharged when the vehicle is powered ON.

The interface between the Mobile Application (209) and the Modular Device (205) is based on wireless communication ports (201) paired with a mobile device (208) where the Mobile Application (209) is installed. The wireless communication ports can rely on existing technology like Wi-Fi, Wi-Fi Direct or Bluetooth, but also any upcoming wireless communication technology provided by modern mobile devices. The Modular Device (205) may optionally include a Cellular Communication Port (210) for the Modular Device (205) to directly interact with the Cloud Service (212) over the Internet (211).

The coordination between the Automotive Protocols Interpreter (202) or Data PINs from the Connector (200) and the wireless communication ports (201, 214) is handled by a Smart Processing Unit (203). The Smart Processing Unit (203) comprises a CPU and a custom Operating System, and its role is to verify the integrity and interpret the data send and coming from both the Mobile Application (209) and the vehicle (207). The Smart Processing Unit (203) also includes an Automotive Protocols Interpreter Library to interact directly with the Connector data PINs (200). In addition, for specific versions of the Modular Device (205), the Smart Processing Unit (203) can execute some of the Mobile Application's (209) logic and buffer the results to an optional Storage Module (204) for asynchronous delivery to the Mobile Application (209) or the Cloud Service (212). The optional Storage Module (204) can also host different types of files like audio or video content. In addition, the optional Storage Module (204) can be shared with and accessed from other devices in the vehicle, including the storage of the mobile device (208), or from other types of applications in the vehicle (e.g., on-board entertainment system).

Figure 3:
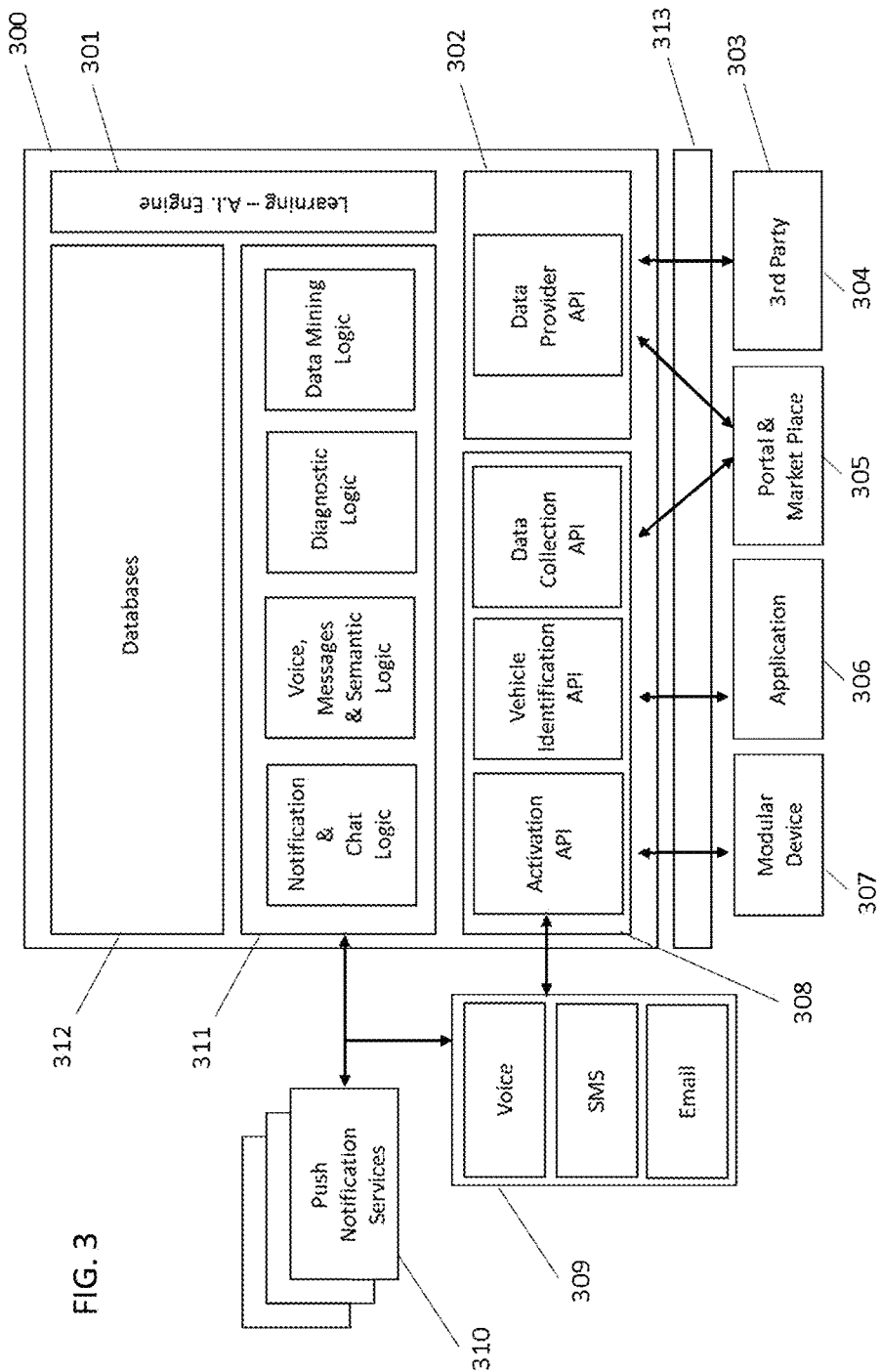
FIG. 3 is a block diagram showing how Cloud Services (Hosted in the Internet) interact with the Mobile Applications of the present disclosure to collect, analyze and return data from vehicles according to an exemplary embodiment of the present disclosure.

FIG. 3 is a block diagram showing how the disclosed Cloud Services interact with the Mobile Application to collect, analyze and return data from vehicles according to an exemplary embodiment of the present disclosure. Here, the Cloud Service (300) is hosted in the Internet (313) and is the intelligence behind the disclosed system. The Cloud Service (300) interacts with different applications and services to send and receive data via public (302) and private (308) Application Program Interfaces (APIs).

Private APIs (308) are in charge of the Mobile Application (306) Activation Process, Vehicle Identification and Data Collection. Modular Device (307) running some of the Mobile Application logic can also interact directly with the Private APIs (308). The Activation Process API also interacts with SMS, Calling & Email services during the Activation Process described in FIG. 8. On the other hand, Public API (302) is a Data Provider for collecting and exposing data with the drivers' Portal & Marketplace (305) and with Third Party partners (304). The different APIs (302, 308) are interfaced to secure and simplify the access to different Business Logics of the system (311). The different Logic modules are interacting with the Databases (312) and the Learning/A.I. engine (301).

Figure 6:
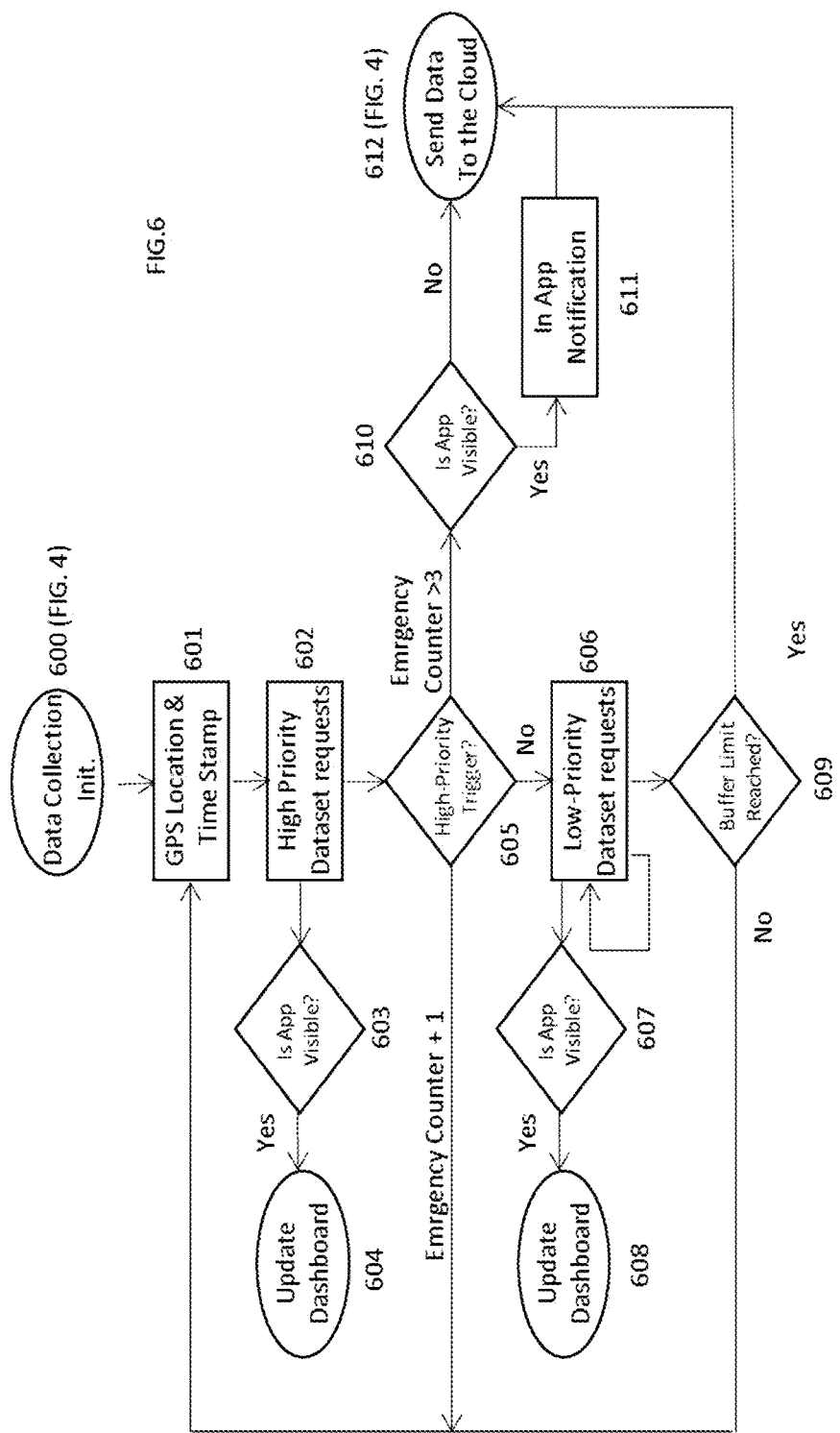
FIG. 6 is a flow diagram showing the process of collecting and prioritizing data according to an exemplary embodiment of the present disclosure.

The Notification & Chat logic is in charge of the silent notifications for triggering the data collection and sending visible notifications on the Mobile Application via Push Notification Services (310). It also handles all the logic to Chat with SMS, Phone and Emails (309). The Voice, Messages & Semantic logic is an intelligent message builder. It interacts with the Databases (312), the Artificial Intelligence Engine (301), the Diagnostic Logic and the Notification & Chat logic to construct custom messages based on multiple criteria and events. The Diagnostic Logic analyses and stores the data collected by the Mobile Application (FIG. 6). It interacts with the Learning/A.I. Engine (301) to provide more proactively and accuracy in the faults detection and solutions to the issues across the time. The Data Mining Logic generates aggregated data for the Learning engine (301) and Third Party partners (304).

Figure 4:
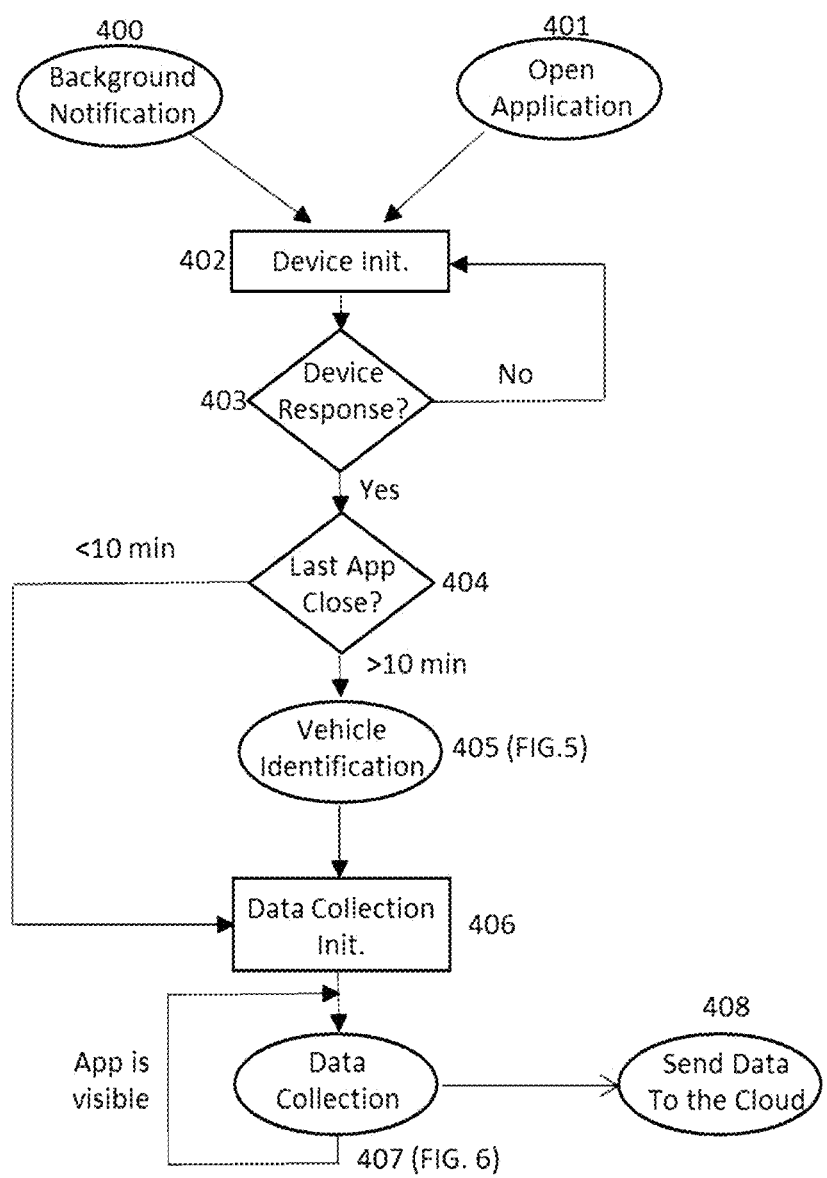
FIG. 4 is a flow diagram showing the process of collecting data from a vehicle according to an exemplary embodiment of the present disclosure.

FIG. 4 is a flow diagram showing the process of collecting data from a vehicle according to an exemplary embodiment of the present disclosure. The main Data Collection Process starts with a silent Background Notification (400) or by opening the Mobile Application Interface (401). Once the process starts, it executes a Modular Device initialization (402). The Modular Device Initialization tries to connect to the Modular Device by sending an initialization command. If no positive response is received from the Modular Device (403), the initialization process tries again or repeats until a positive response is returned by the Modular Device. If the Mobile Application is open and no positive response is received after certain amount of tries, the initialization process returns a message to the driver and prompts the driver to check the connectivity for the Modular Device.

If a positive response is received from the Modular Device, the Mobile Application checks the last time the Mobile Application was closed by the driver (404). If the Mobile Application has been close for more than a defined time (e.g., 10 minutes), the Mobile Application executes a Vehicle Identification (405) in order to check if the system is still connected to the same vehicle. The Vehicle Identification process is described in details in FIG. 5. If the Mobile Application has been closed for less than the defined time (e.g., 10 minutes), the Mobile Application starts the Data Collection Initialization process (406). The Data Initialization process sets the Mobile Application context to collect data from the current vehicle based on the information from Vehicles Profiles data. Then the Data Collection process (407) starts. The Data Collection process is described in details in FIG. 6. If the Mobile Application is open, the data collection process (407) loops to provide real-time update of the Data through the Dashboard User Interface of the Mobile Application. When a specific event is triggered by the Mobile Application, the collected data are sent to the Cloud Service (408).

Figure 5:
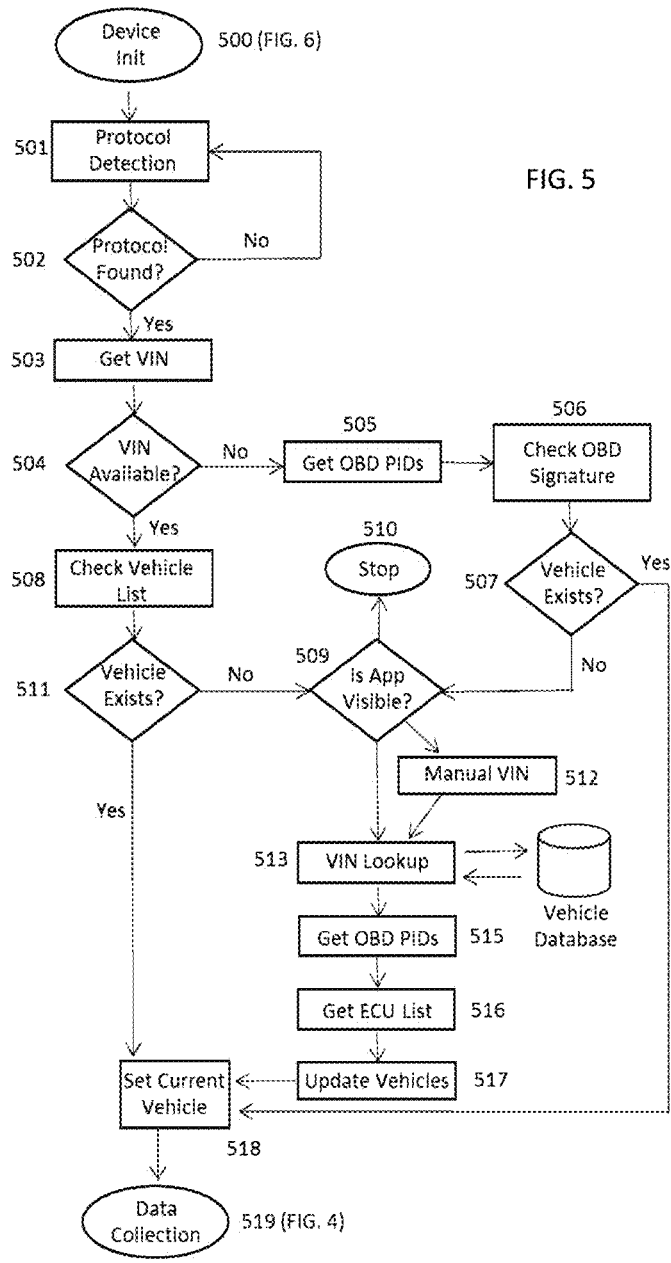
FIG. 5 is a flow diagram showing the process of identifying a vehicle according to an exemplary embodiment of the present disclosure.

FIG. 5 is a flow diagram showing the process of identifying a vehicle according to an exemplary embodiment of the present disclosure. After the Modular Device Initialization process (FIG. 4), if the Mobile Application has not been opened for more than the defined time (e.g., 10 minutes), a Vehicle Identification process is executed to check if the Modular Device has been connected to another vehicle in the meantime.

The first step of the Vehicle Identification is the Protocol Detection (501). The Mobile Application requests the vehicle with the last protocol used, if the response is not positive with this protocol (502), the Mobile Application sends the requests repeatedly to each of the different protocols for automotive until it matches the current vehicle protocol. Then the application requests the Vehicle Identification Number (VIN) (503). If the vehicle doesn't return the VIN (504), the Mobile Application requests the list of the On-Board Diagnostics Parameter IDs (OBD-II PID)'s the vehicle is compatible with (505). Each vehicle has different PID's compatibility list and associated to the vehicle protocol, it provides a good signature to identify the vehicle and replace the VIN. With this signature, the process will check the other existing vehicles' signatures in the Mobile Application's Vehicles Profiles (506).

If the signature matches any other vehicle and the vehicle already exists (507), the process sets the vehicle as the current vehicle (518) and starts the Data Collection Process (FIG. 6). If the vehicle returns a VIN number (504), the process checks if one of the vehicle in the Mobile Application's Vehicles Profiles already has this VIN (508). If the vehicle already exists (511), the process sets the vehicle as the current vehicle (518) and starts the Data Collection Process (FIG. 6). If the vehicle doesn't exist (507, 511) and the Mobile Application is not visible (510), the process stops. The Mobile Application has to be visible to add a new vehicle in the vehicles Profiles.

If the vehicle doesn't return a VIN and doesn't exist in the vehicles Profiles (507) and the Mobile Application is visible (509), the process displays an alert with a text field to the drivers to manually enter the VIN (512). Once the process has a VIN for the new vehicle, it proceeds to the VIN Lookup (513) to insert the new vehicle in the Cloud Service database and get the vehicle details in return. If needed, the process will request the vehicle for a list of OBII-PIDs (516) and a list of Controllers' Units available. The Mobile Application's Vehicle Profiles is updated with the new vehicle (517), the process sets the vehicle as the current vehicle (518) and starts the Data Collection Process (519->FIG. 4).

FIG. 6 is a flow diagram showing the process of collecting and prioritizing data according to an exemplary embodiment of the present disclosure. When the Data Collection Initialization is done (600<-FIG. 4), the process creates a Time Stamp and collect the current location of the vehicle with the mobile device's GPS (601). Then the process requests the vehicle with a set of High Priority requests like Speed, RPMs, Fuel system, Engine related Data, brakes & Airbags systems if available (602).

If the Mobile Application is visible (603), the Dashboard User Interface is updated with the values of the data collected (604). If no High-Priority threshold is triggered, the process continues with subsets of Low Priority requests (606). If the Mobile Application is visible (607), the Dashboard User Interface is updated with the values of the data collected (608). For each data collection cycle, a different Low-Priority subset of requests is executed, to collect a maximum of data without impacting the speed of collection for High-Priority data. Preferably, the average duration of a Data Collection cycle is around 2 sec.

At the end of each Data Collection cycle, the size of the buffer for Collected Data is checked. If the Buffer Limit is not reached, the next Data Collection cycle starts (609). If one or multiple High-Priority threshold are triggered, the process set an emergency counter, and a short cycle of steps (601) and (602) runs, incrementing the counter if one or multiple High-Priority threshold are triggered again. When the Emergency Counter (605) is equal to 3 or Buffer Limit is reached (609), the process sends Data to the Cloud Services (612). If the Mobile Application is visible (610), an in-app visual alert with voice is informing the drivers about the status of the vehicle (611).

Figure 7:
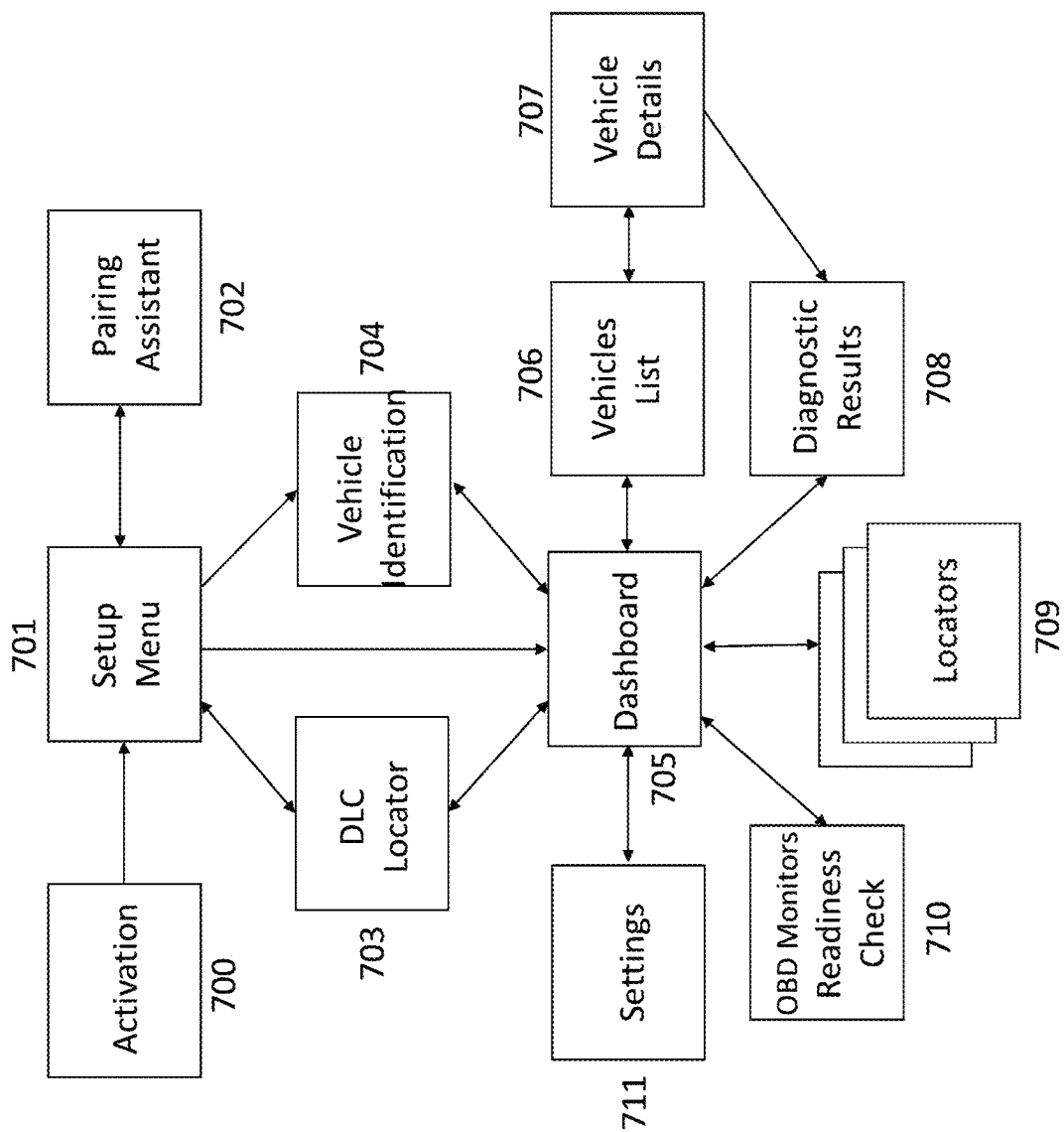
FIG. 7 is a block diagram showing an exemplary storyboard of the Mobile Application according to an embodiment of the present disclosure.

FIG. 7 is a block diagram showing an exemplary storyboard for the Mobile Application according to an embodiment of the present disclosure. Here, the Mobile Application includes a voice narrator to provide an easy and augmented experience. At first launch, the end-user must create or use an existing account to activate the application (700). This process is described in details in FIG. 8. Once activated, the Mobile Application proposes a Setup Menu (701) to assist the end-user with the system installation.

Figure 9:
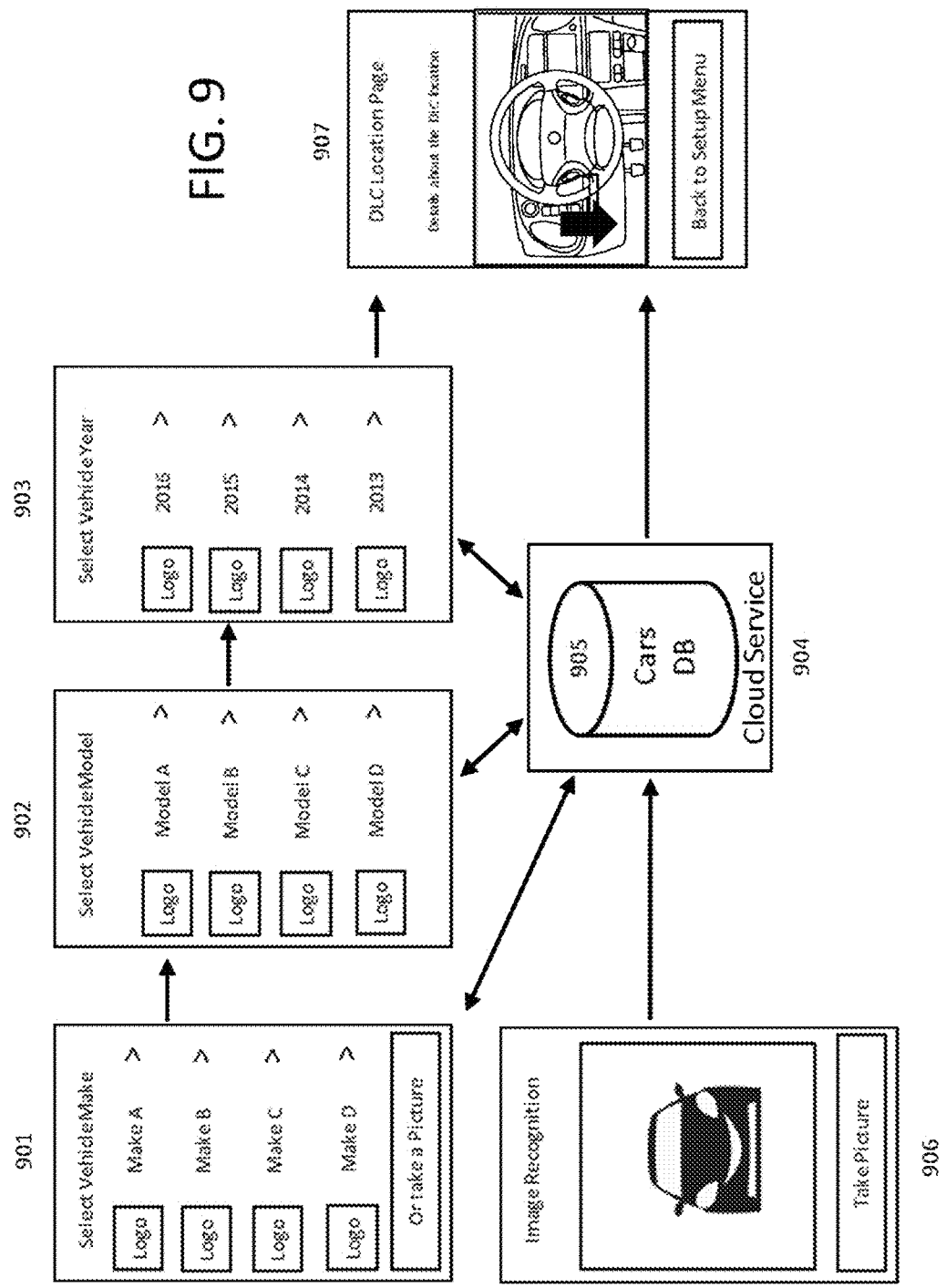
FIG. 9 is a flow diagram showing the process of locating the Diagnostic Link Connector of a vehicle according to an exemplary embodiment of the present disclosure.

The first item of the Setup Menu (701) is a step by step process to locate the Diagnostic Link Connector to plug the Modular Device (703), which is described in details in FIG. 9. This process is also accessible from the Dashboard (705) if the end-user wants to use the system with additional vehicles. The second item of the Setup Menu (701) provides the information to assist the end-user to pair the mobile device and the Modular Device (702). The last item of the Setup Menu (701) is the first Vehicle Identification process (704). It creates the internal Vehicle Profiles dataset and notify the driver about the vehicle information found before accessing the DashboardDashboard (705) and then starts the data collection. This process is also called by the DashboardDashboard (705) when a new vehicle is detected by the application.

The Dashboard (705) is the main interface of the Mobile Application. The DashboardDashboard (705) is described in details in FIG. 10. Even if the Mobile Application is designed to run in the background, the Dashboard (705) provides real-time information about the vehicle and an access to the diagnostic results (708), the vehicles List (706) and details (707), Locators to find Gas Stations, Repair locations, Smog Check test centers (709), an OBD Monitors Readiness Check (710) to prepare Smog Check or regulatory certifications and the application Settings (711).

Figure 8:
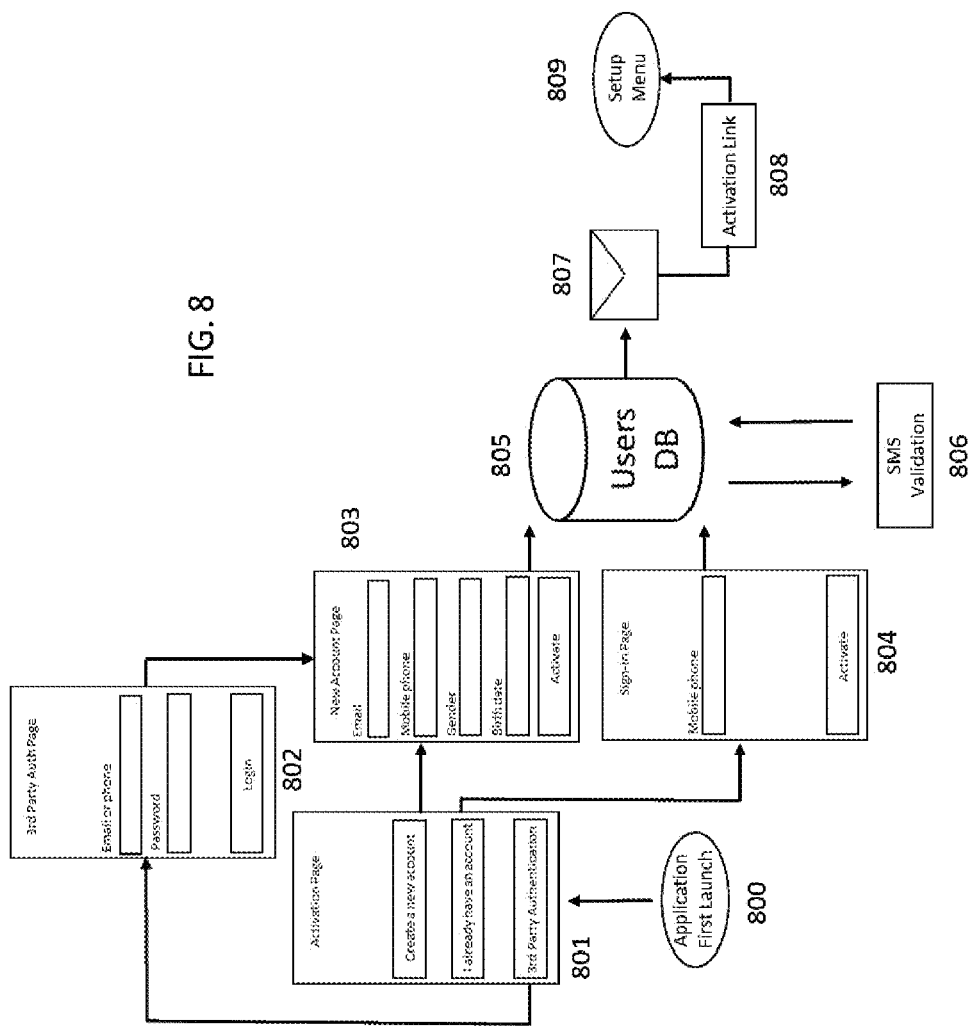
FIG. 8 is a flow diagram showing the process of activating the Mobile Application and creating a password-less account according to an exemplary embodiment of the present disclosure.

FIG. 8 is a flow diagram showing the process of activating the Mobile Application and creating a password-less account according to an exemplary embodiment of the present disclosure. At the first launch (800), the Mobile Application requires an activation to ensure that it is able to properly identify the end-user for efficient notifications. A menu prompt to the end-user to create a new account, enter information for an existing account or use a Third Party authentication or Single Sign On proposed by some Social Networks or other providers (801).

The Third Party Authentication page (802) asks for existing credentials the end-user already have with a Third Party service. The page may also ask for additional permissions to share personal data related to the end-user. After a successful authentication with the Third Party service, the New Account page (803) is prefilled with the personal information returned by the Third Party service. This is the same New Account Page (803) that the end-user must fill if he chose to create a New Account from the main Activation Page (801). This pages requires personal information like the email and phone number of the mobile device hosting the Mobile Application, and the end-user's gender and birth date. If the end-user already has an account, the sign-in page (804) simply asks for the mobile phone number the user is using for his or her account.

The Mobile Application collects the information from the different authentication pages (803, 804), checks the format of the mobile phone numbers and the email addresses, and sends them to the Users Database in the Cloud Service (805). The Cloud Service returns a verification message (e.g., a short challenge response) to the end-user to confirm that the user is the registered user. Once confirmed, the Cloud Service (805) updates the Users Database (805) and sends an email (807) to the end-user to confirm that he is the registered user. This email includes a unique Activation Link (808). When the end-user clicks on the link, it activates the Mobile Application and displays the Setup Page of the Mobile Application.

FIG. 9 is a flow diagram showing the process of locating the Diagnostic Link Connector (DLC) of a vehicle according to an exemplary embodiment of the present disclosure. To assist the end-user to find the location of DLC, the Mobile Application provides a step by step process to identify the vehicle and display the location of its DLC. The end user can either chose to select the vehicle by make (901) or to take a picture of it (906).

When the end-user selects the make of his vehicle, the Mobile Application returns a list of the existing vehicles for that make (902). Then the end-user selects the model of the vehicle and the Application returns a list of year to select the manufacturing one of the vehicle. If the end user selects the picture based option, he can take a picture of his vehicle. The Application sends the picture to the Cloud Service for analysis (904).

At each step, this process interacts with the Cloud Service (904) and its vehicles Database (905). The vehicles Database (905) contain details for each vehicle on the market since 1996. The last page of the process (907) displays a view of the vehicle's cockpit and an arrow pointing to the location of the DLC for this specific vehicle. This page also includes a detailed description about how to access the DLC.

Figure 10:
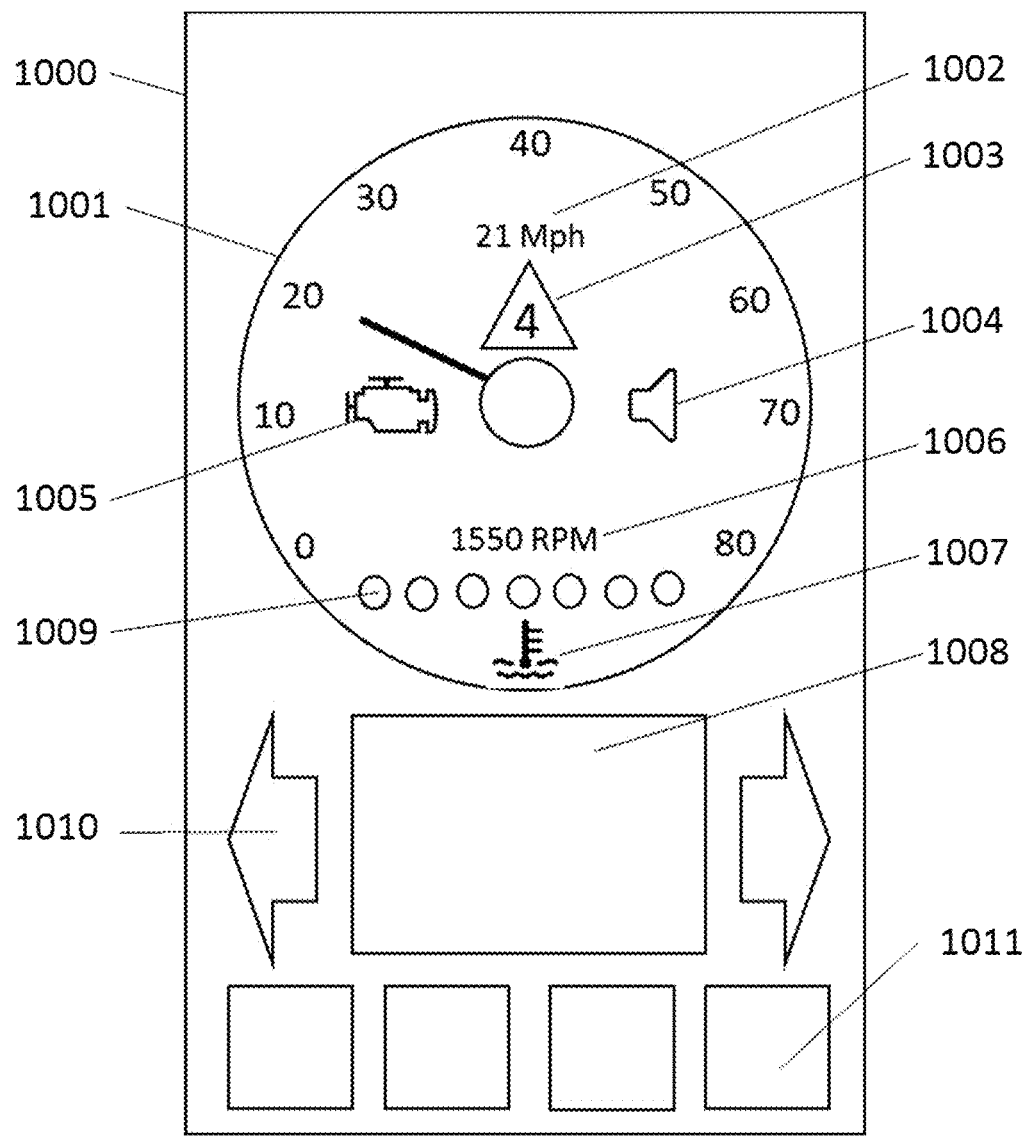
FIG. 10 is a schematic diagram showing an exemplary display screen of the main Dashboard according to an embodiment of the present disclosure.

FIG. 10 is a schematic diagram showing exemplary display screen of the main Dashboard according to an embodiment of the present disclosure. The Dashboard screen (1000) is the default landing page of the Mobile Application. It displays information in real-time. Among other things, it includes a speedometer (1001, 1002), the engine speed in RPM (1006), the engine coolant temperature status (1007), the engine MIL (1005) and a button to switch the voice assistant to ON or OFF (1004). A triangle (1003) displays the number of errors detected by the Application. Green, orange, red LED style images (1009) are used to show the engine speed level and to alert the driver. During each diagnostic cycle, these images are switched to a LED Chaser mode. An information screen (1008) displays different information about the car (Fuel level, coolant temperature, battery voltage, . . . ). Two arrow buttons (1010) provide the navigation between each screen. Sliding the finger to the left or to the right on the Dashboard screen provides the same behavior. Additional buttons (1011) are also available to provide a quick access to some functions (Diagnostic results, Locators, Settings, . . . ).

Figure 11:
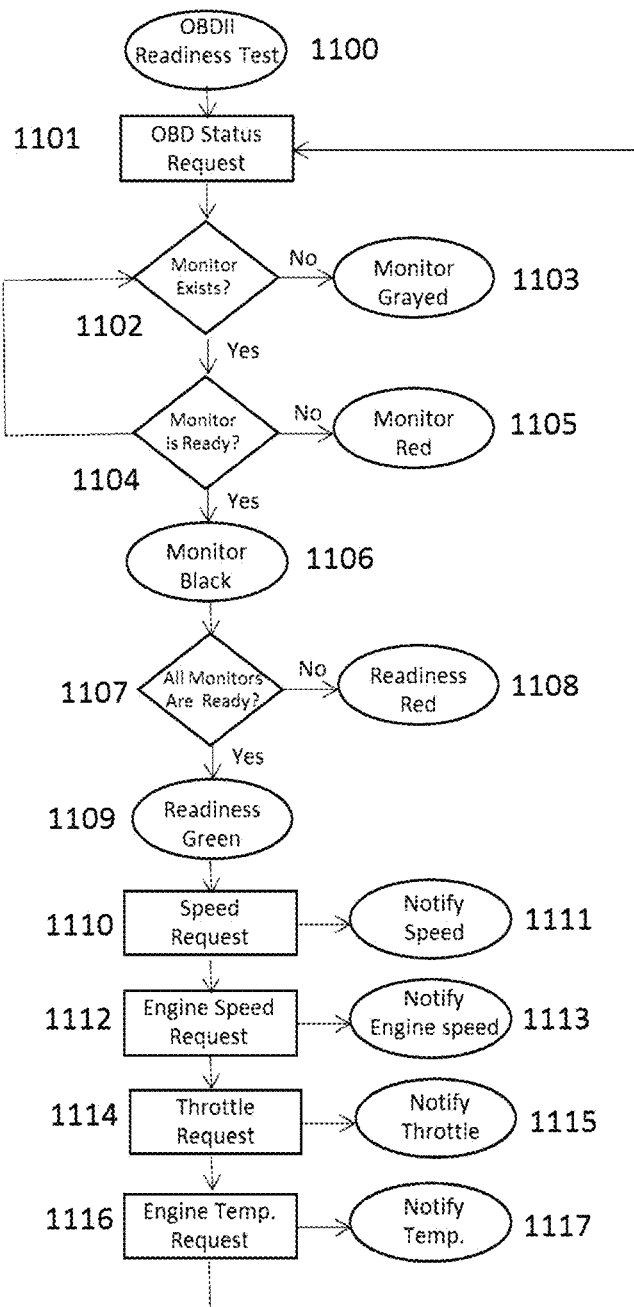
FIG. 11 is a flow diagram showing the process of checking, displaying and assisting the OBD-II monitors readiness according to an exemplary embodiment of the present disclosure.

FIGS. 11 and 12 are flow and schematic diagrams showing the process of checking, displaying and assisting the OBD-II monitors readiness according to an exemplary embodiment of the present disclosure. In this embodiment, the On-Board Diagnostics (OBD) system runs up to 12 tests, called Monitors, referred to as inspection and maintenance readiness monitors. In some states or countries, these monitors have to be ready to pass the regulatory inspections.

The OBD Readiness test (1100) process begins with global OBD Status request (1101). Then the result of this request is decoded to check for each of the 12 monitors to determine if they exist (1102) and if they are ready (1104). The user interface (1200) is updated with monitor availability status color (1201, 1103) and readiness status text (1201, 1105,1106) for each monitor. A global readiness status (1203, 1107,1108,1109) keeps the driver notified on the screen and with voice.

Monitors readiness depends on specific drive cycles and criteria. Vehicle speed, engine speed and temperature, throttle are important metrics to meet specific criteria and get the monitors readiness check as fast as possible and avoid hours of driving to get the results. The process includes requests for these metrics (1110, 1112, 1114, 1116) and notify the drivers on screen and with voice (1202, 1111, 1113, 1115, 1117) about the behavior he needs to keep to meet the tests criteria.

Figure 13:
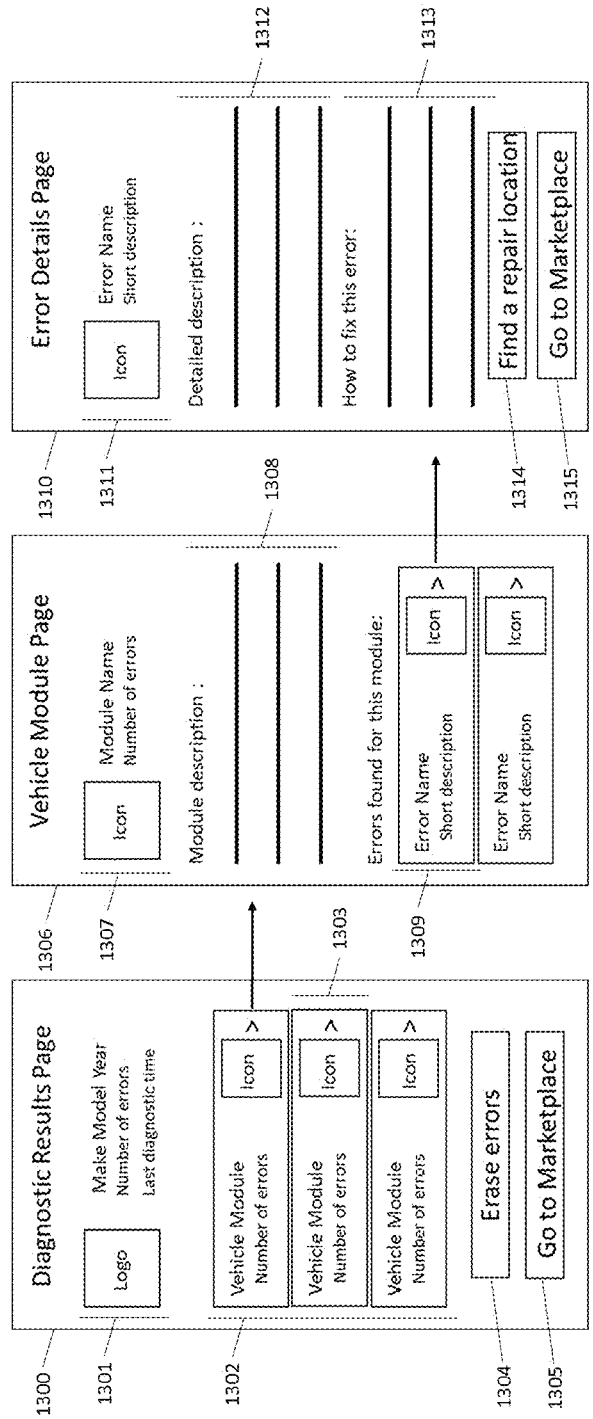
FIG. 13 is a schematic diagram showing user screens displaying diagnostics information for a specific vehicle according to an exemplary embodiment of the present disclosure.

FIG. 13 is a schematic diagram showing exemplary user screens displaying diagnostics information for a specific vehicle according to an embodiment of the present disclosure. A diagnostic results screen (1300) for the current vehicle is accessible from the Dashboard and from each vehicle details screen. It includes the vehicle's Make, Model, Year and Make Logo, the number of errors found during the last diagnostic cycle and the last diagnostic date & time (1301). It also includes a list of the errors (1302) by Vehicle Module (Ignition System, Air/Fuel Metering, Safety Module, Airbags, . . . ) with the name, the number of errors and an Icon for the module (1303). The end user can select each line (1303) of the list to access the Vehicle Module Details screen (1306). The screen includes two buttons to erase the errors (1304) from the vehicle memory and to go to the marketplace (1305) to request a quote to repair the vehicle.

The Vehicle Module Details screen (1306) provides information about the module, including its name, logo, number of errors (1307) and a detailed description of the module (1308). The Vehicle Module Details screen (1306) also includes a list with the name, an icon and a short description for each of the error found for this module (1309). The end user can select each error line of the list to access the Error Details screen (1310). The Error Details screen includes the error name, short description and icon (1311). It also includes a detailed description of the error (1312) and the common ways to fix it (1313). Finally, the screen includes two buttons to find a repair location (1314) in the area and to go to the marketplace (1315) to request a quote to repair the vehicle.

Figure 14:
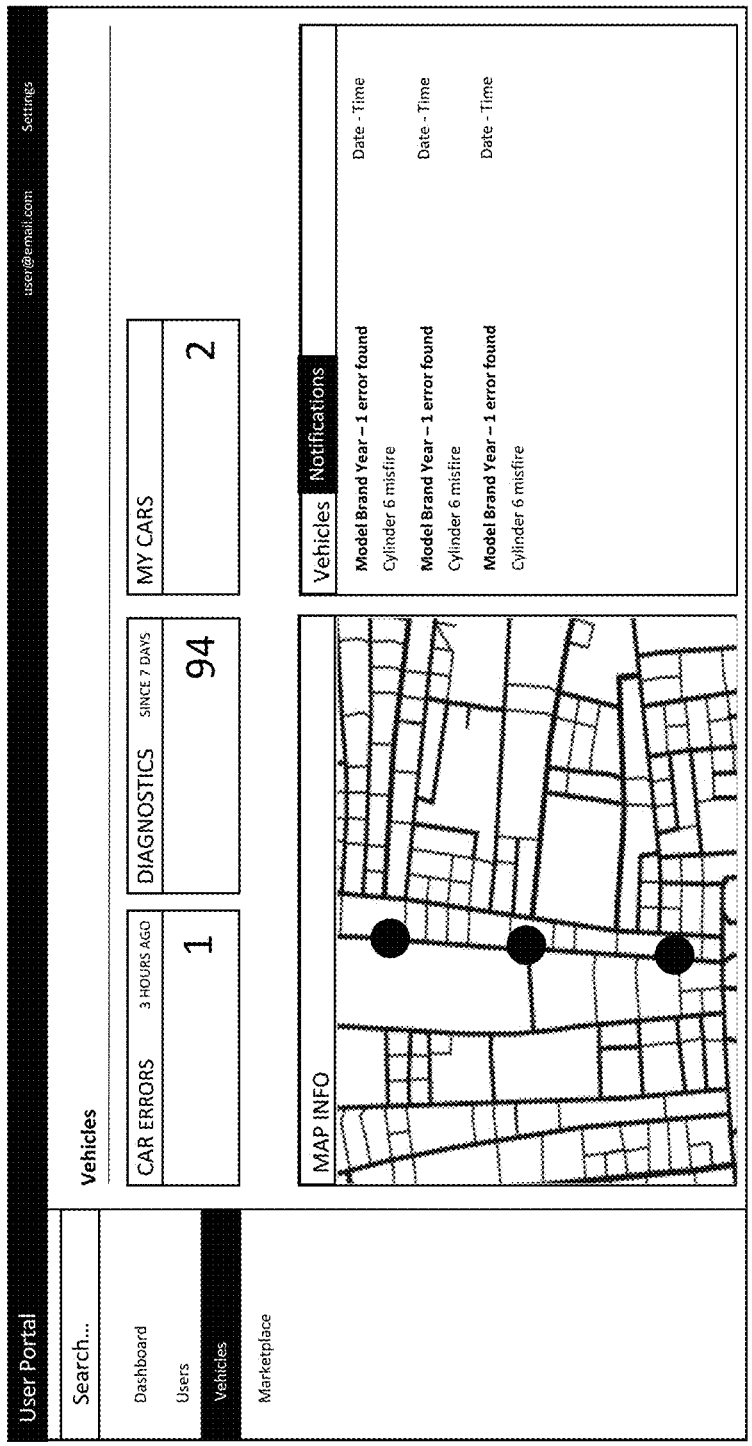
FIG. 14 is a schematic diagram showing an exemplary display screen for the Internet portal allowing the users to view various information, including diagnostic history for vehicles according to an embodiment of the present disclosure.

FIG. 14 is a schematic diagram showing an exemplary display screen for the Internet portal that allows the users to view various information, including diagnostic history for vehicles according to an exemplary embodiment of the present disclosure. In addition to the Mobile Application, a Web Portal is available for the end-users to access the vehicle data. This portal provides an extended experience to view the diagnostic history, aggregated data for the vehicles attached to a specific driver, but also to a user community and marketplace.

Figure 15:
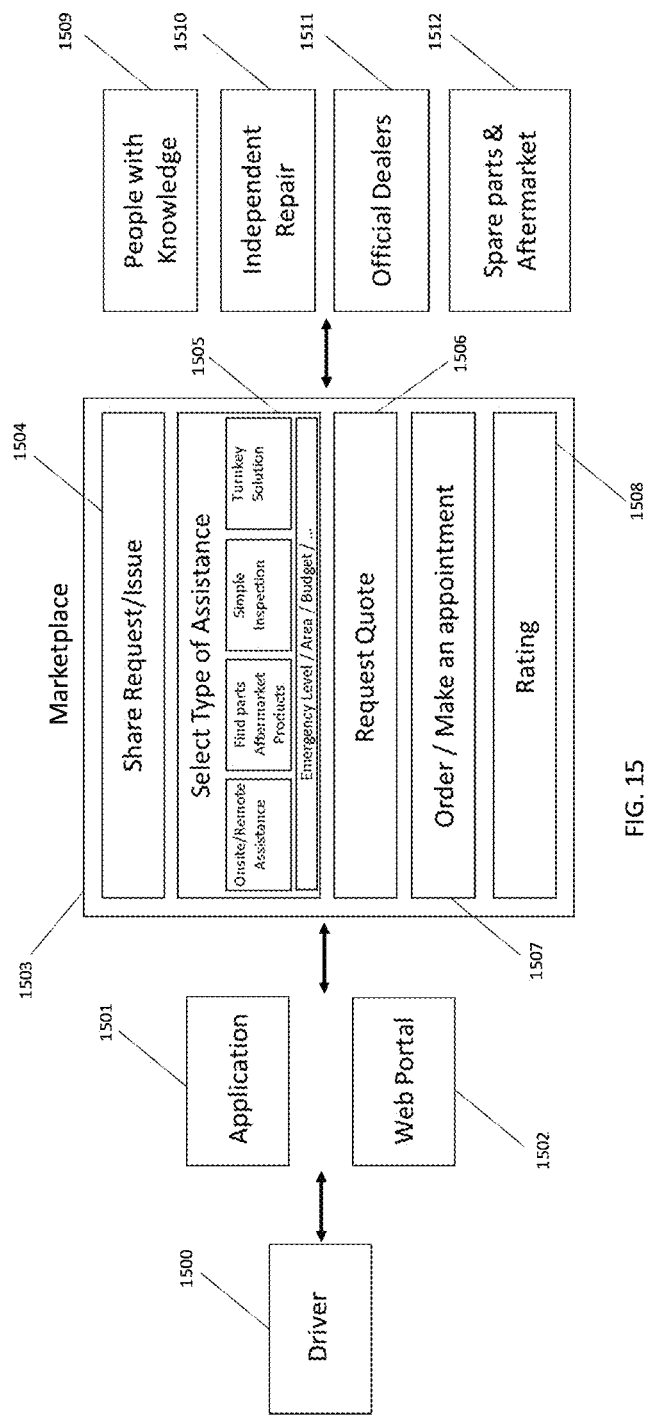
FIG. 15 is a block diagram showing the marketplace that connects drivers with Third Party services or people according to an exemplary embodiment of the present disclosure.

FIG. 15 is a block diagram showing the marketplace to connect drivers with Third Party services or people according to an exemplary embodiment of the present disclosure. The Marketplace (1503) provides the drivers (1500) with an easy way to connect with Third Party services through the Mobile Application (1501) or the Web Portal (1502).

In the Marketplace (1503) the driver (1500) can Share a Request or Issue (1504) and define the Type of Assistance (1505) the driver is looking for. Depending on the driver's own personal profile, the driver can choose between multiple assistance choices like, but not limited to, Onsite or Remote assistance, Find parts or aftermarket products, a Simple Inspection or Turnkey Solution. Additional criteria like the level of emergency, the area, the budget are available. Then the driver sends a quote request (1506).

As soon as the driver requests a quote (1506), Third parties have access to the request based on their profiles, domain of competence and location. Third parties include, but are not limited to, People with Knowledge (1509) who can assist the driver based on their own experience or background, Independent Repair (1510) locations, Official dealers (1511) or Spare parts & aftermarket resellers (1512). Third parties with interest in a request return quotes and the driver can select one of the offers, make an order and/or an appointment (1507). The driver is invited to provide his or her feedback and rate (1508) the Third Party providers based on multiple criteria to help other drivers for their third Party provider selection.

Figure 16:
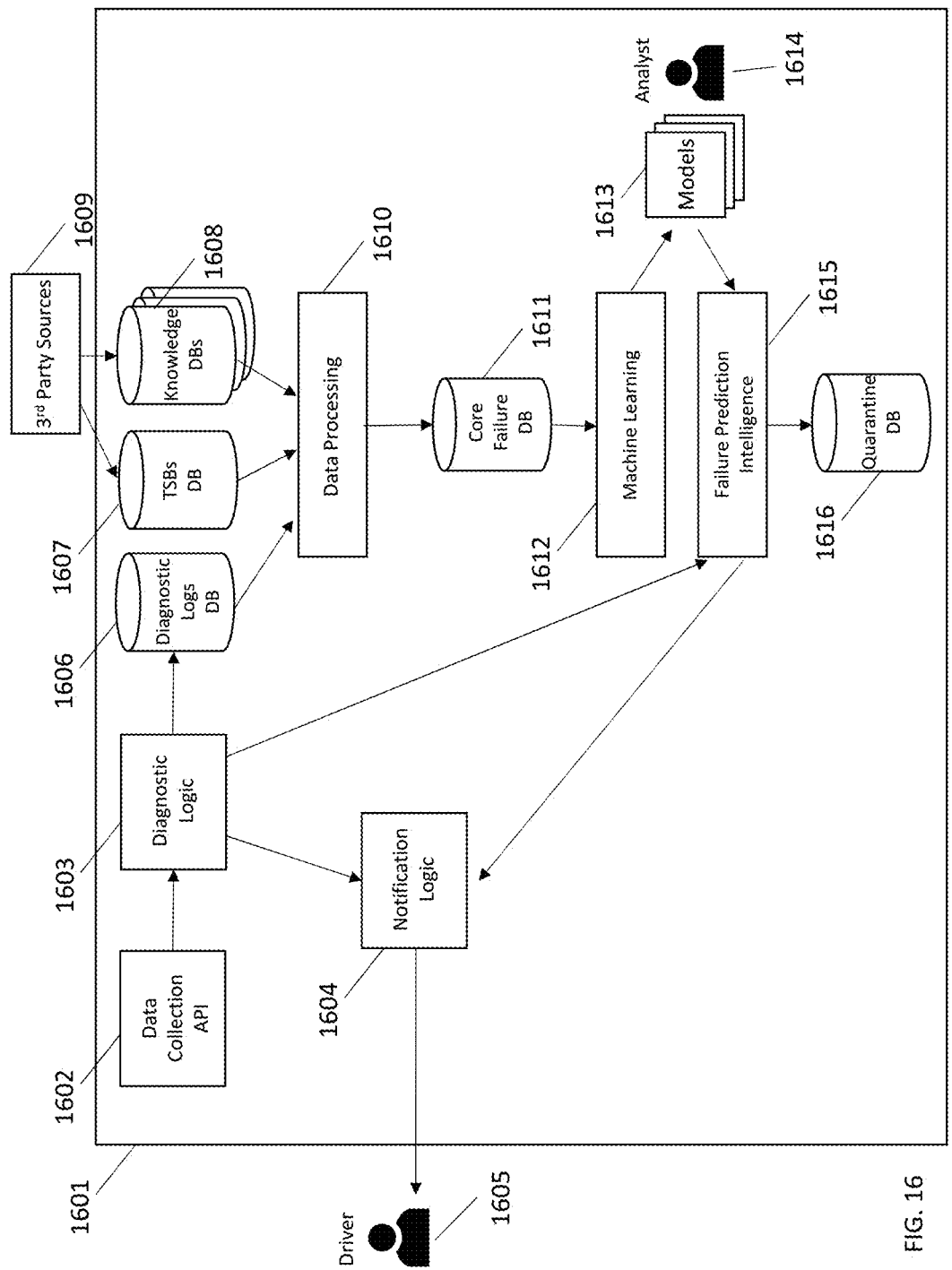
FIG. 16 is a block diagram showing a predictive failure system according to an exemplary embodiment of the present disclosure.

FIG. 16 is a block diagram showing a predictive failure system used by the present disclosure according to an exemplary embodiment of the present disclosure. In the Cloud Service (1601), Diagnostic details ingested by the Data Collection API (1602) can return standard OBD, controller and/or sensors error codes. If diagnostic details include one or more of these standard codes, the Diagnostic Logic (1603) triggers the Notification Logic (1604) to send a warning with the details about this error to the driver through the Mobile Application (1605). In addition, the details of the diagnostic scan that is run by the Mobile Application on each vehicle (e.g., approx. every 5 minutes when driving) is stored in the Diagnostic Logs Database (1606).

The invention enriches existing arts, usually comparing timestamped performance data for a given vehicle, with similar data but from multiple vehicle having common parts (Model, Manufacturer, supplies) and additional data sources providing predictable knowledge of existing vehicle failures matching specific metrics or conditions. Data sources available from Third Parties (1609) include, but are not limited to, Technical Support Bulletins (TSBs) (1607) provided by car manufacturers, knowledge bases (1608) from repair stations, drivers or any other provider. Every time one of these database is updated, a data processing logic (1610) aggregates and filters the data to updates a Core Failure Database (1611). These data are computed by a machine learning engine (1612) based on predictive models (1613) designed, tested and optimized by analysts (1614) to feed the Failure Prediction Intelligence (1615).

Every time a new diagnostic is received by the data collection API (1602), a query with the Vehicle Identification Number and diagnostic details is sent by the Diagnostic Logic (1603) to the Failure Prediction Intelligence (1615) to evaluate the risk of failure based on the current vehicle state. If the Failure Prediction Intelligence (1615) identifies a pattern that match a probable failure but needs more data to confirm it, the vehicle VIN and current data are stored in a quarantine database (1616). Data collected by the next diagnostic processes will be used to re-evaluate the failure. If the Failure Prediction Intelligence (1615) confirms an imminent failure, it triggers the notification logic (1604) to send a warning with the details about the detected issue to the driver through the Mobile Application (1605), and data in the Quarantine Database (1616) are updated to keep this vehicle flagged until the failure is fixed. If the Failure Prediction Intelligence (1615) does not detect any upcoming failure based on the last data collected, the vehicle is removed from the Quarantine Database (1616).

The Failure Prediction Intelligence (1615) can also trigger the Notification Logic (1604) to send pro-active warnings to the driver through the Application (1605) and on a regular pace, or on specific events (vehicle reaching a specific mileage), to suggest pro-active actions like part replacement based on Technical Support Bulletin or other source of information.

Figure 17:
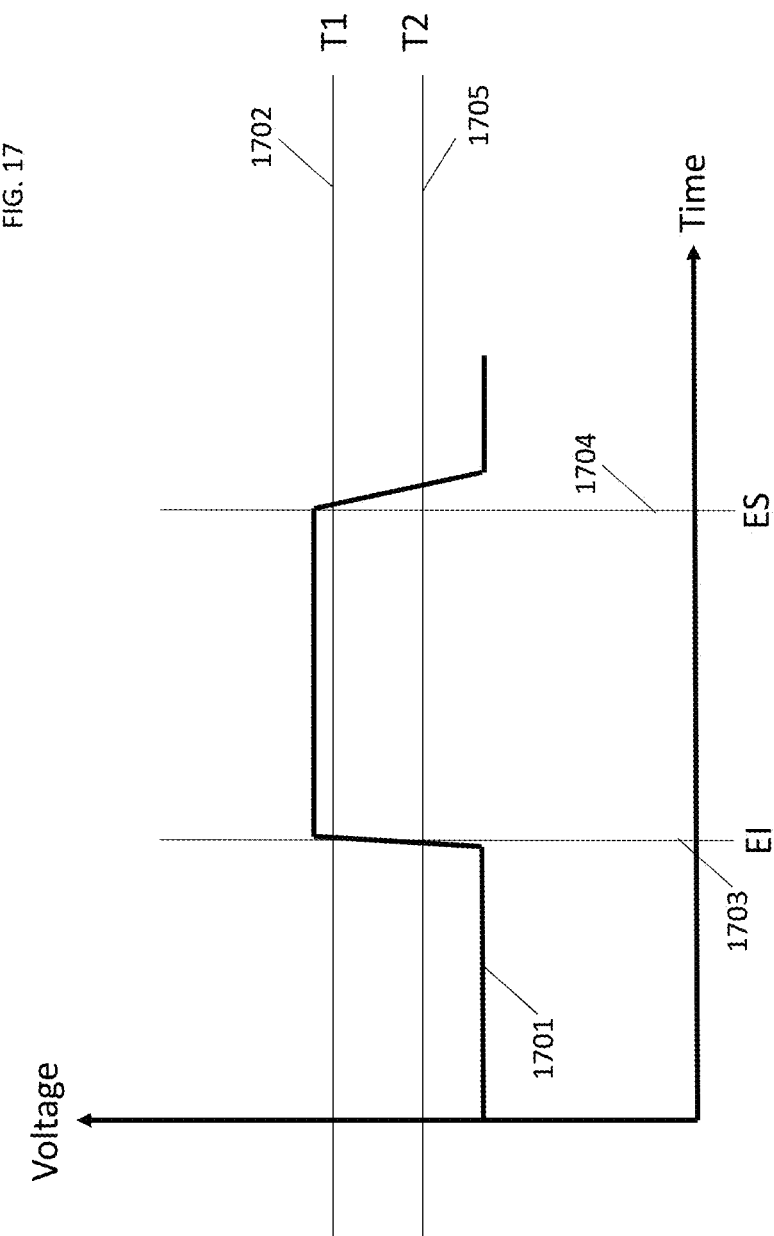
FIG. 17 is a schematic diagram showing the vehicle battery voltage to illustrate the low-power cut-off logic of the disclosed system according to an exemplary embodiment of the present disclosure.

FIG. 17 is a schematic diagram showing the vehicle battery voltage to illustrate the low-power cut-off logic of the disclosed system according to an exemplary embodiment of the present disclosure. The Modular Device (205) described in FIG. 2 includes a low-power cut-off system to protect the vehicle's battery based on Diagnostic Link Connector's voltage (1701). The system is designed to detect a specific voltage threshold (T1—1702) when the engine ignition is turned on (1703) and then powered on. This prevent the Modular Device from draining the battery when plugged and vehicle's engine is turned OFF. While the engine runs, the voltage always remains over T1 (1702) and the Modular Device is operating as expected. When the engine ignition is turned OFF (1704), another specific voltage threshold (T2—1705) is detected and turns the Modular Device's power OFF.

Figure 18:
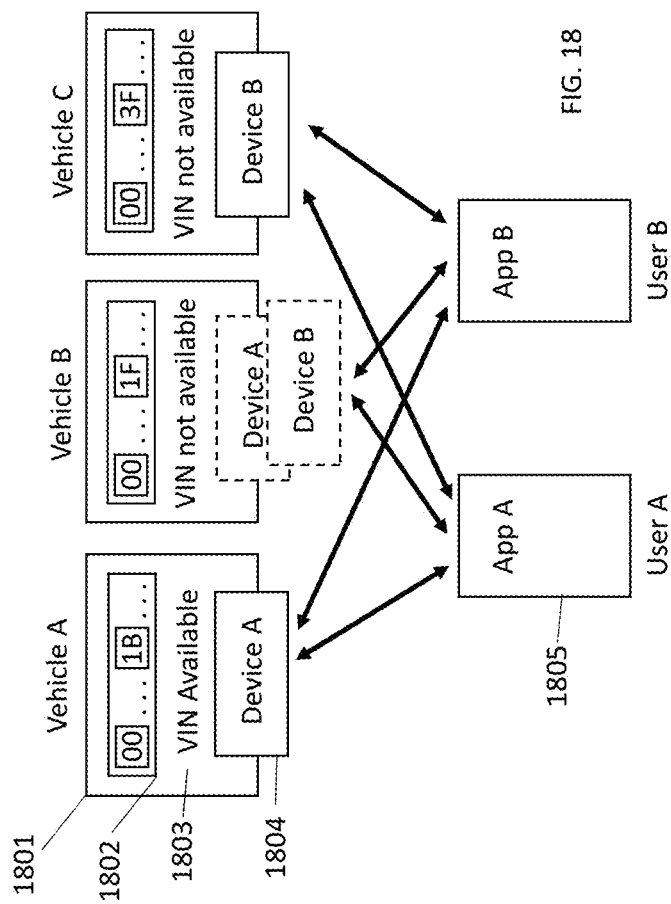
FIG. 18 is a block diagram showing the disclosed system's flexibility with multiple vehicles, devices and users according to an exemplary embodiment of the present disclosure.

FIG. 18 is a block diagram showing the flexibility of the system with multiple vehicles, devices and users according to another exemplary embodiment of the present disclosure. Here, the system is designed to offer a maximum flexibility and combinations of use. Multiple users/Mobile Applications (1805) can connect to multiple registered Modular Devices (1804) as soon as they are paired once. Each Modular Device (1804) can be attached to a single vehicle (1801) or shared across multiple vehicles (1801). Some vehicle does not return their Vehicle Identification Number (VIN) through OBD requests. To keep track of the different vehicles a user/app (1805) is linked to, the system creates for each vehicle (1801) a signature based on the OBD PIDs (1802) and, if available, of controller IDs (1802) to create a signature the application (1805) can check during the launch process.

FIG. 19 is a schematic diagram showing an exemplary Vehicle Health Report generated by the disclosed system according to an embodiment of the present disclosure. The disclosed system can generate a Vehicle Health Report (1901) and share it with Third Parties, like buyers or repair stations to explain if the vehicle has suffered of failures. This report may include Vehicle Identification Number (1902), description (1903) and, first (1904) and last (1905) use of the system. Vehicle Health Report may include a graphic (1906) that summarizes the history of measurements to show the active time ranges of measurements and highlights the errors that have been detected and for how long they have been active. A table (1907) may also be provided to show a list of each error that has been detected with the first and last date of detection, the error description and the level of significance of this error. This report or information included in this report can be used to or associated with proofs of repair and/or service history. They can be used as a trusted source for the vehicle technical history during the time range it covers.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A system, comprising:
a modular device with a wireless communication port for establishing a communication with a mobile device, and a connector for coupling the modular device to a vehicle's Diagnostic Link Connector to transmit and receive data from the vehicle's controllers;
a mobile application that is installed and executed on the mobile device's operating system;
a Cloud Service that comprises one or more database, Application Program Interfaces (APIs), Business Logic, and an intelligent learning engine, where the Cloud Service is connected to third party services and market place including push notifications, short messages and automated call services;
wherein the modular device receives requests from the mobile application to collect the vehicle's data and transmits the data collected from the vehicle to the mobile application;
wherein the Cloud Service triggers the mobile application at a specified interval to initiate data collection from the vehicle;
wherein the data collection is triggered in the operating system's background;
wherein the mobile application comprises a voice synthesis library that provides integrated voice synthesis service to alert the vehicle's driver using the mobile device's default language;
wherein the wireless communication port comprises a secure mechanism to pair the modular device with the mobile device;
wherein the mobile application sends the data collected from the modular device to the Cloud Service and the Could Service analyzes the data, stores the data and generates a message if the data matches a rule defined in the Cloud Service or by vehicle's driver,
wherein the Cloud Service sends the messages to the mobile application through a push notification service and the mobile application alerts the vehicle's driver, and
wherein the mobile application includes an interface with an easy installation process, a real-time dashboard, profile and status for each vehicle it is linked to, a locator to find the Diagnostic Link Connector.

2. A system, comprising:
a modular device with a wireless communication port for establishing a communication with a mobile device, a J1962 male diagnostic 16 PINs connector for coupling the modular device to a vehicle's Diagnostic Link Connector to transmit and receive data from the vehicle's controllers, and a low-power cutoff mechanism to prevent battery drain and shut down the modular device when the engine is not running in order to prevent any intrusion tentative when the vehicle is on standby for a period;
a mobile application that is installed and executed on the mobile device's operating system;
a Cloud Service that comprises one or more database, Application Program Interfaces (APIs), Business Logic, and an intelligent learning engine, where the Cloud Service is connected to third party services and market place including push notifications, short messages and automated call services;

wherein the modular device further comprises a smart processing unit that comprises a CPU and a custom operating system for verifying and interpreting data transmitted and received from the mobile application and the vehicle;

wherein the modular device receives requests from the mobile application to collect the vehicle's data and transmits the data collected from the vehicle to the mobile application;

wherein the Cloud Service triggers the mobile application at a specified interval to initiate data collection from the vehicle;

wherein the data collection is triggered in the operating system's background;

wherein the mobile application comprises a voice synthesis library that provides integrated voice synthesis service to alert the vehicle's driver using the mobile device's default language;

wherein the wireless communication port comprises a secure mechanism to pair the modular device with the mobile device;

wherein the mobile application includes an interface with an easy installation process, a real-time dashboard, profile and status for each vehicle it is linked to, a locator to find the Diagnostic Link Connector;

wherein the mobile application sends the data collected from the modular device to the Cloud Service and the Could Service analyzes the data, stores the data and generates a message if the data matches a rule defined in the Cloud Service or by vehicle's driver; and wherein the Cloud Service sends the messages to the mobile application through a push notification service and the mobile application alerts the vehicle's driver with a voice-based version of the message.

\* \* \* \* \*